US011548438B2

(12) United States Patent
Martin et al.

(10) Patent No.: US 11,548,438 B2
(45) Date of Patent: *Jan. 10, 2023

(54) MULTIFUNCTION LIGHTING MODULE AND ITS USE

(71) Applicant: Methode Electronics, Inc., Chicago, IL (US)

(72) Inventors: Kevin M. Martin, Southfield, MI (US); Eric D. Sherriff, Nelson (CA); Srinivas Akkala, Canton, MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,823

(22) Filed: Dec. 15, 2021

(65) Prior Publication Data

US 2022/0105865 A1    Apr. 7, 2022

Related U.S. Application Data

(63) Continuation of application No. 17/336,391, filed on Jun. 2, 2021, now Pat. No. 11,254,262.
(Continued)

(51) Int. Cl.
| | | |
|---|---|---|
| *B60Q 3/85* | (2017.01) | |
| *F21V 23/04* | (2006.01) | |
| *F21V 23/00* | (2015.01) | |
| *B60Q 3/80* | (2017.01) | |
| *B60Q 3/70* | (2017.01) | |
| *B60Q 3/76* | (2017.01) | |
| *B60Q 3/225* | (2017.01) | |

(Continued)

(52) U.S. Cl.
CPC ............... *B60Q 3/85* (2017.02); *B60Q 1/00* (2013.01); *B60Q 3/217* (2017.02); *B60Q 3/225* (2017.02); *B60Q 3/233* (2017.02); *B60Q 3/51* (2017.02); *B60Q 3/70* (2017.02); *B60Q 3/76* (2017.02); *B60Q 3/80* (2017.02); *B60R 16/0207* (2013.01); *F21V 23/002* (2013.01); *F21V 23/003* (2013.01); *F21V 23/0485* (2013.01); *B60Q 2400/50* (2013.01); *F21Y 2115/10* (2016.08)

(58) Field of Classification Search
CPC ... B60Q 3/51; B60Q 3/70; B60Q 3/76; B60Q 3/80; B60Q 3/85; B60Q 3/217; B60Q 3/233; B60Q 1/85; B60Q 2400/50; B60Q 1/00; F21V 23/002; F21V 23/003; F21V 23/0485; B60R 16/0207; F21Y 2115/10
See application file for complete search history.

(56) References Cited

U.S. PATENT DOCUMENTS

2014/0267975 A1 *  9/2014  Ying ................... B60Q 3/47
                                                 362/520
2019/0054856 A1    2/2019  Salter

* cited by examiner

*Primary Examiner* — Thomas M Sember
(74) *Attorney, Agent, or Firm* — Blank Rome LLP

(57) ABSTRACT

An integrated lighting insert is provided for multi-function automotive vehicle lighting that has minimal space requirements and provides different lighting functions in a single device with an electronic control module that can easily interface with vehicle electronics. The insert is a housing and a plurality of light transmission portions, a plurality of light sources integrated into the housing, each one configured for a different predetermined function associated with a particular use of, a condition of, or a state of the automobile. An electrical circuit is used along with a communications bus and individual controller circuits associated with the light sources for controlling the light functions.

12 Claims, 4 Drawing Sheets

Related U.S. Application Data

(60) Provisional application No. 63/034,121, filed on Jun. 3, 2020.

(51) Int. Cl.
*B60Q 3/51* (2017.01)
*B60R 16/02* (2006.01)
*B60Q 3/217* (2017.01)
*B60Q 3/233* (2017.01)
*B60Q 1/00* (2006.01)
*F21Y 115/10* (2016.01)

MULTIFUNCTION LIGHTING MODULE AND ITS USE

CROSS REFERENCE TO RELATED APPLICATIONS

This is a continuation of and claims the benefit of the filing date and disclosure of U.S. patent application Ser. No. 17/336,391, filed Jun. 2, 2021, which is based on and claims the benefit of the filing date and disclosure of U.S. Provisional Patent Application No. 63/034,121, filed on Jun. 3, 2020, which are incorporated herein by reference in their entirety.

BACKGROUND OF THE INVENTION

Field of Invention

The invention relates to lighting systems for use in automotive applications, including those systems used for lighting automobile interior cabin features with various lighting effects.

Description of Related Art

Automotive interior lighting has become a desirable feature offered in many transportation vehicles, including passenger automobiles. Lighting systems are often integrated into existing vehicle components, such as a door, pillar, roof, window, seat, floor, storage, and/or instrument panel.

Many of the lighting systems provided in automobiles today offer a single function, such as illuminating a specific area of the vehicle's interior, providing ambient light for mood and comfort, decorating portions of the vehicle using various color light, conveying warning or safety information, and identifying the location of switches, buttons, and surfaces, among others.

Designers have added these types of lighting systems to provide different specific or multiple features and functions, but at the same time are confronted with space, electrical, material, decorative, and other constraints and limitations. Moreover, multiple lighting devices and systems scattered throughout a vehicle cabin, each with its own on/off/dimmer switch, electronic control module, and separate wiring harness, can complicate a vehicle's already complicated electrical system.

Because of its proximity to the driver, typical automotive door trim has been equipped with lighting systems and devices for use by the driver, including integrated ambient lighting. Examples include separate safety lamps indicating to remote observers that the driver's door (or a passenger's door) is open. Others use static, two-dimensional lighting effects. Often, doors-specific lighting devices involve different control modules or systems that require integration with other lighting systems (potentially made by others) that themselves are integrated in other parts of the vehicle interior.

What is needed is an integrated lighting insert providing multi-function automotive vehicle lighting that has minimal space requirements and provides different lighting functions in a single device with an electronic control module that can easily interface with the vehicle electronics.

BRIEF SUMMARY OF THE INVENTION

In one aspect, a decorative two-dimensional lighting insert intended to be incorporated in an automotive interior door trim panel is provided, the lighting insert having a suite of at least six lighting features satisfying at least safety, functionality, and decorative needs.

In another aspect, the lighting insert provides comprehensive coordinated lighting control and system behavior in a complete module or package.

In still another aspect, the lighting insert combines common features needed by separate lighting components, thus realizing lower overall unit price and vehicle cost.

In another aspect, the lighting insert features a decorative insert that includes (1) an blind spot indicator light for indicating the presence of adjacent lane (blind spot) traffic, (2) an door open condition light (such as a strobe), (3) an ambient light suitable for reading, (4) a ground illuminating light (puddle lamp), (5) a dynamic multi-zone two-dimensional ambient light or light, and (6) a map pocket illuminating ambient/mood light.

In still another aspect, the lighting insert is adapted for controlling certain of the lighting features, such as the use of an integrated capacitive or other touch sensing areas built into the backlit fabric area of the device or other hard surfaces of the lighting insert.

Uses for the lighting insert include transportation vehicles such as passenger automobiles, trains, trucks, recreational vehicles (RVs), buses, and aircraft.

Other uses for the lighting insert described herein include home or office furnishings (such as smart desks, smart chairs, smart beds, and the like), as well as appliances (such as refrigerators).

DETAILED DESCRIPTION OF THE INVENTION

Figure 1:
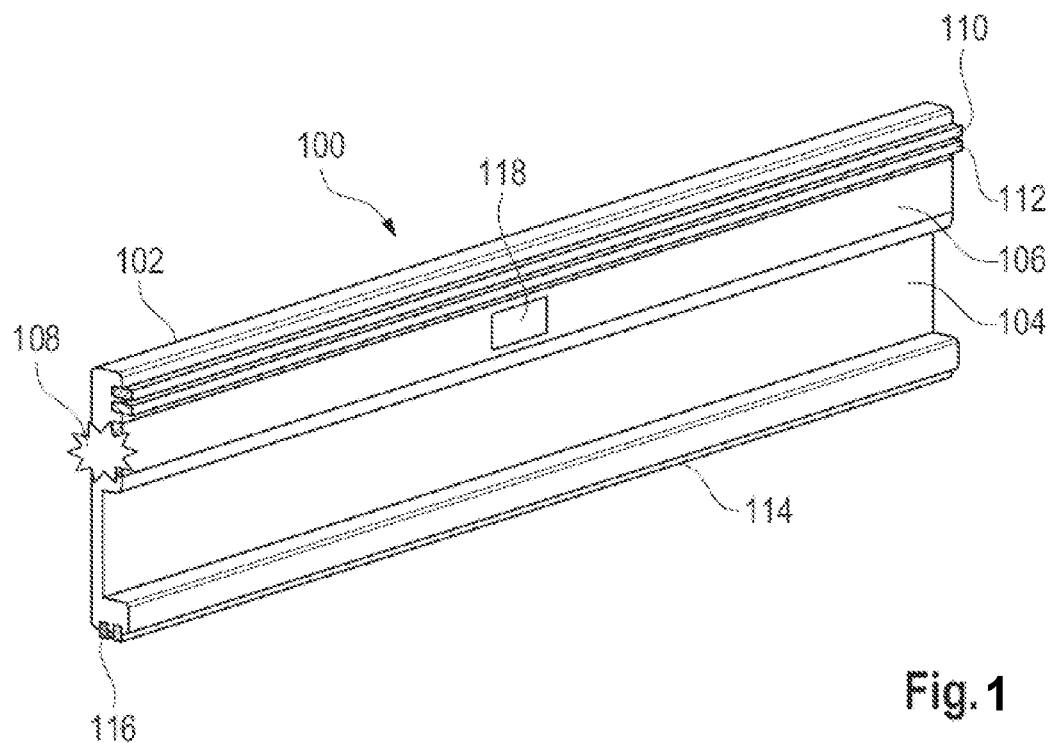
FIG. 1 is an isometric view diagram of the lighting insert 100 according to some of the above aspects of the invention.

Several preferred embodiments of the invention are described for illustrative purposes, it being understood that the invention may be embodied in other forms not specifically described below and/or shown in the drawings.

FIG. 1 is an isometric view diagram of a lighting insert 100 according to one embodiment of the invention. The lighting insert 100 may take the general shape shown in the figure, or it may be molded to conform to the ornamental, angular, and/or arcuate shapes and surfaces of a component or panel to which it is attached, embedded, or otherwise integrated, such as surface shapes prevalent in automotive interior design. In one embodiment, the lighting insert 100 is designed to be integrated into an interior side of a vehicle door panel.

The lighting insert 100 includes a housing portion 102, which may be elongated as shown or have some other shape.

The housing 102 may include a back side (not shown) configured to abut against at least a portion of another device or surface, and a front side (shown) opposite the back side having a surface facing an interior of a vehicle cabin. The housing 102 may also include left and right sides (left side shown) on opposite ends of the housing 102.

The front side of the housing 102 may include one or more ornamental surfaces, including but not limited to, a surface containing a relief pattern machined, stamped, or etched into/onto the surface or provided by way of a shaped mold. In addition, the front side of the housing 102 may be contain a fabric or material layer over a substrate. The fabric or material could match or coordinate with a fabric or material of a door panel to which the lighting insert 100 is attached. For example, the fabric or material could be a polymeric material or a naturally-derived material like wood or leather commonly found in automobile interiors.

The substrate to which the fabric or material is attached could be any suitable metal, alloy, carbon fiber, polymeric substance, or combination of those materials that satisfies particular requirements, including but not limited to those for rigidity, vibration, flexibility, stiffness, acoustics, heat resistance, and weight. In particular, given the concentration of multiple lighting features in a single lighting insert, the substrate should consist of a material and construction that avoids overheating at surfaces a vehicle passenger might come in contact with, while conducting excess thermal energy to a heat sink (which could be a component of the vehicle and environment outside the vehicle). By selecting the appropriate material as the substrate for the housing 102, temperature monitoring can be avoided.

The housing 102 may optionally include an interior cavity portion 104, for receiving therein another component or device. The cavity portion 104 may be an elongated cutout, groove, or slot as shown, or it may have some other shape. The surface of the cavity portion 104 may, like the rest of the housing 102, include one or more ornamental surfaces, including but not limited to, a relief pattern machined, stamped, or etched into/onto the surface, or provided by way of a shaped mold, or it may be include a fabric or material layer overlaying the substrate.

The housing 102 may include one or more light generation and transmission devices, including a backlit fabric area light 106, a safety flasher light 108, a blind spot presence indicator light 110, a reading lamp 112, a ground illuminating lamp 114, and a map pocket ambient illuminating lamp 116. Each of the separate lighting devices may have a unique function as described below, or serve multiple functions.

The backlit fabric area light 106, may comprise a light source which is covered the fabric or material previously described. The particular weave density of the fabric and/or material is such that some of the light generated by the light source may diffuse through to the side that is visible to the observer inside the vehicle. In one embodiment, the light source may be one or more LEDs arranged linearly along the length of the backlit area 106 (or some fraction of the backlit area). In another embodiment, the light source could include one or several LEDs optically coupled to one or more linear or curved light bars that extend the length of the backlit area 106 (or some fraction of the backlit area). In still another embodiment, the light source could be a single light source or multiple light sources arranged in front of a suitably-shaped reflector that extends the length of the backlit area 106 (or some fraction of the backlit area). Other means for backlighting a fabric or material to provide diffuse light are also contemplated.

The safety flasher light 108 may be disposed at an end of the housing 102, corresponding to the free (unhinged) edge of an automobile door panel to provide illumination as a warning to others that the door is in an open state. In one embodiment, the flasher 106 may include multiple (e.g., three) LEDs (each an RGB LED) that illuminate on at the beginning of a flashing sequence and off at the end of a time period to provide a strobe light effect that is highly visible to remote observers such as nearby vehicles, bicyclers, and pedestrians. The LEDs may be designed to output a particular desired color. In another embodiment, a lens could be used, made from a specific material and shaped such that the primary visible color transmitted to the observers is the desired color, such as red.

The blind spot presence indicator light 110 may be disposed along an upper portion of the housing 102 to provide an indication to the vehicle's operator of the presence of adjacent lane (blind spot) traffic. In one embodiment, the blind spot presence indicator light and lens 110 may be related to one or more blind spot sensors on the vehicle periphery and automatically illuminate at the beginning of a sequence and turn off at the end of a time period to provide a constant or flashing light effect that is sufficiently visible at least in the driver's peripheral field of vision. In one embodiment, the light may include multiple (e.g., three) LEDs (each an RGB LED). The LEDs may be designed to output a particular desired color, for example, orange. In another embodiment, a lens could be used, made from a specific material and shaped such that the primary visible color transmitted to the observers is the desired color.

The reading lamp 112, may be disposed along an upper portion of the housing 102 below the blind spot presence indicator light and lens 110 to provide light having a brightness and color sufficient for reading. In one embodiment, the light may turn on when the state of a switch connected to the light is manually changed from a power off to a power on state, and may remain powered on for a period of time, or upon some new condition being triggered (e.g., the door is opened or the vehicle is turned off). In one embodiment, the light may include multiple (e.g., three) LEDs (each an RGB LED). The LEDs may be designed to output a particular desired color. In another embodiment, a lens could be used, made from a specific material and shaped such that the primary visible color transmitted to the observers is the desired color.

The ground illuminating lamp 114 (also known as a puddle lamp), may be disposed along a lower portion of the housing 102 to project light having sufficient brightness and color downward onto the ground as a vehicle's door is opened for a passenger to enter or exit the vehicle, or when a passenger approaches a vehicle door from the outside. This light is for the safety and comfort of the passenger, but may also provide a visual indication to others, or it may display characters or shapes on the ground, such as a logo. In one embodiment, the light may stay illuminated as long as a sensor outputs a signal indicating the door is in the open position or senses the presence of an electronic device, such as a key fob, mobile phone, token generator, or the like. In one embodiment, the light may include multiple (e.g., three) LEDs (each an RGB LED). The LEDs may be designed to output a particular desired color. In another embodiment, a lens could be used, made from a specific material and shaped such that the primary visible color transmitted to the ground is a desired color.

The map pocket ambient illuminating lamp 116, may be disposed along a lower portion of the housing 102 to project light having sufficient brightness and color downward into a map pocket, which if provided is typically positioned on the lower portion of the inside vehicle door panel. If no map pocket if provided, the light provides general ambient/mood lighting around the lower portion of the door and peripheral portions of the vehicle's door sills and floor. In one embodiment, the light may stay illuminated as long as power is delivered to the light, and may remain illuminated or switch off after a period of time. In one embodiment, the light may include multiple (e.g., three) LEDs (each an RGB LED). The LEDs may be designed to output a particular desired color. In another embodiment, a lens could be used, made from a specific material and shaped such that the primary visible color transmitted to the map pocket or floor is a desired color.

In other embodiments, some of the lights described above may serve multiple purposes and illuminate more than one area or zone of the vehicle. For example, the map pocket ambient illuminating lamp 116 could also serve as the ground illuminating lamp 114, and vice-versa.

Figure 2:
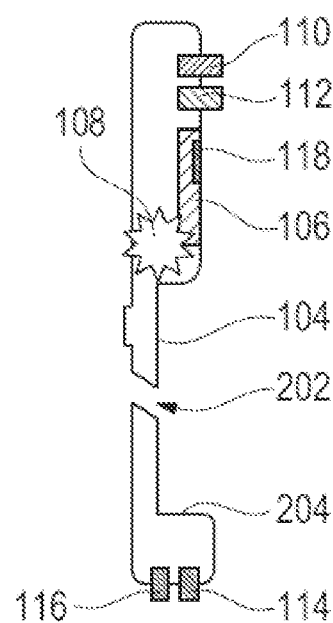
FIG. 2 is a section view diagram showing a lighting insert 100, of the kind shown in FIG. 1, mounted on a vehicle door panel 200.

Turning now to FIG. 2, shown therein is a cross view diagram of the lighting insert 100 of FIG. 1 viewed from the left side of the lighting insert 100. In addition to the elements previously described, this view illustrates an opening, gap, or through-hole 202 that passes through the cavity portion 104 from its front side to the back side of the housing 102. The opening 202 may be a single through-hole (circular, square, or some other shape), or it may be a groove- or slot-shaped opening that extends laterally along all or a portion of the length of the cavity portion 104. The opening 202 may provide for attachment of an armrest, as best shown in FIG. 3, or provide additional lighting.

Figure 3:
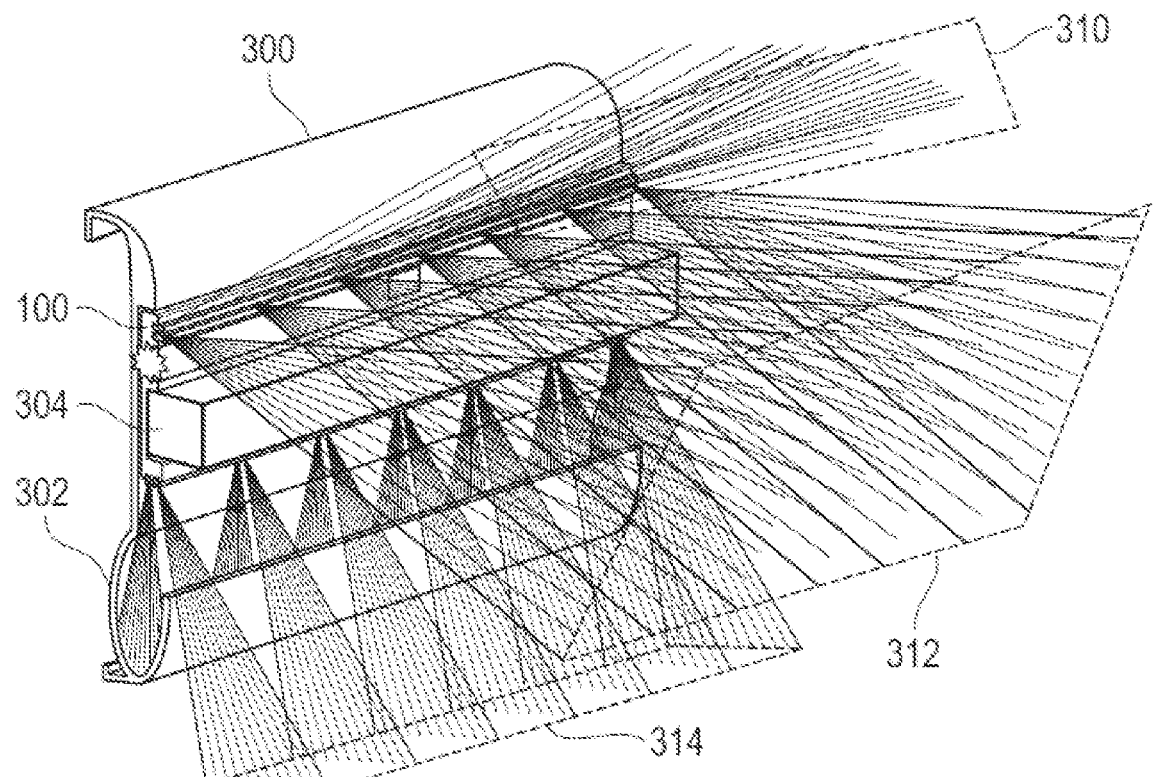
FIG. 3 is an isometric view diagram of the lighting insert of FIG. 1 in a mounting configuration on the door panel.

Turning now to FIG. 3, shown therein is an isometric view diagram of the lighting insert 100 mounted on a vehicle door panel 300. In the embodiment shown, the door panel includes a map pocket or storage cavity 302 and an armrest 304. The armrest 304 is inserted into the cavity portion 104 of the housing 102 and extends away from the door panel 300.

In one embodiment, the light ray "beams" from the various light sources are shown projected from the individual light sources as single points of light, or single LEDs (or groups of LEDs spaced close to one another). In another embodiment, the light rays emitted from some of the light sources may be continuously distributed along the length of the lighting insert 100. This may be achieved by using one or more elongated light pipes, or light covers having a sufficient shape to diffuse the light from single light sources and make it appear as if the light is from multiple sources. When light pipes are used, they may be optically coupled to the LEDs to distribute the light from the LEDs all along the length of the pipe.

Light directivity may be achieved by using one or more optical lens and/or light pipes, and/or top fire and side fire LEDs, and/or flex PCBs. Any suitable lens or reflector may also be sued to direct and project light from the light sources. In one embodiment, one or more surfaces of the light pipes or light covers/lenses may be coated with a reflective or opaque material, or otherwise arranged, angled, faceted, or shaped, in such a way that light is transmitted in one or more desired pre-determined directions and at one or more pre-determined spread angles.

For example, in one embodiment the blind spot presence indicator light 110 may transmit light, when it is powered on, that projects through a region of space inside the vehicle defined in part by planar surface 310, which is a region in space estimated to be most visible to the driver when sitting in a typical driving configuration.

In another example, the reading lamp 112 may transmit light, when it is powered on, that projects through a region of space defined in part by planar surface 312, which may include the lower seat cushion and center console area of the vehicle. As shown, the direction of light from the reading lamp 112 is primarily set at an angle that is different than the direction of light from the blind spot present indicator light 110; moreover, planar surface 310 and 312 may not be parallel to each other.

In still another example, the ground illuminating lamp 114 may transmit light, when it is powered on, that projects through a region of space defined in part by planar surface 314, which may be a specific area on the ground outside the vehicle.

Light directivity and spread angles may be modified manually by reorienting the various light sources, lenses, or light pipes from a first configuration to a second, different configuration. Light directivity and spread angles may instead be modified by changing from one type of light source that is powered on to another type of light source that is differently configured.

Figure 4:
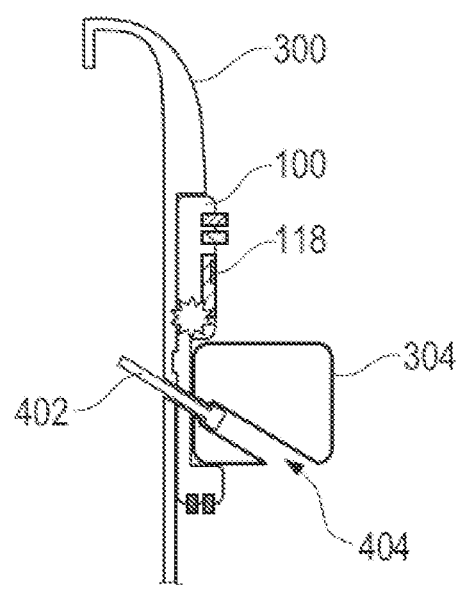
FIG. 4 is a block diagram showing various electrical, circuit, and components of the lighting insert.

Turning to FIG. 4, shown therein is a cross-section view of the lighting insert 100 and door panel 300 of FIG. 3. In one embodiment, one or more mechanical fasteners 402 (only one shown) may be used to connect the door armrest 304 to the vehicle door panel 300 (or a portion thereof). The mechanical fasteners 402 may be, for example, one type or a combination of different types of fasteners, such as bolts or screws. Access to each of the mechanical fasteners 402 could be provided by corresponding through-holes 404 (only one shown).

Figure 5A:
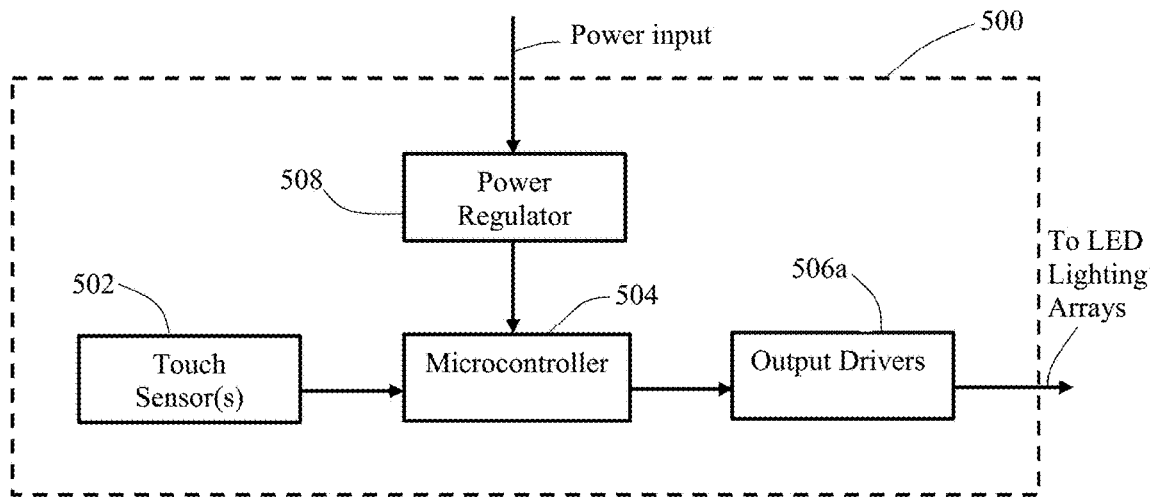
FIGS. 5A and 5B are schematic block diagrams showing different components of embodiments of a touch device for the lighting insert.
Figure 5B:
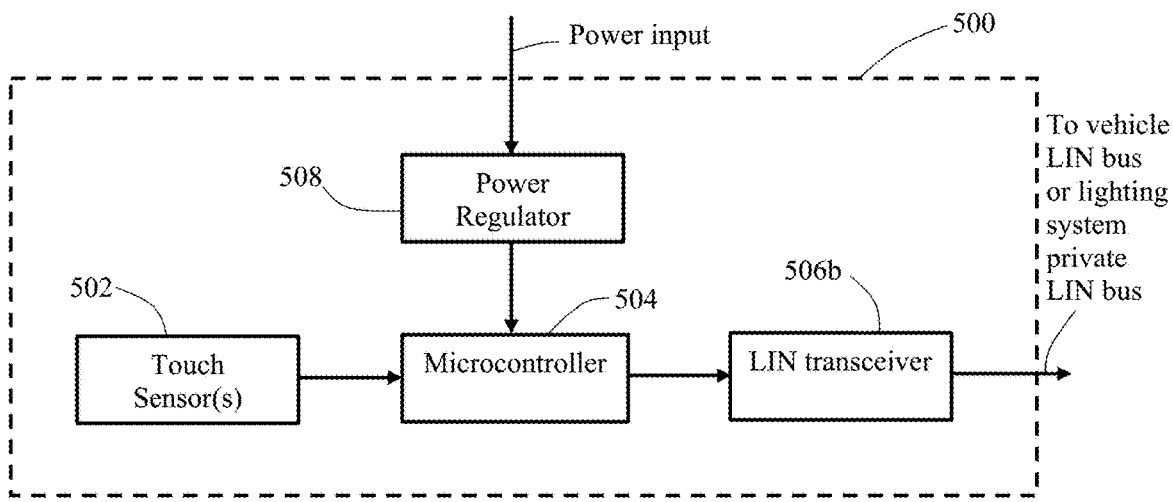
Figure 6:
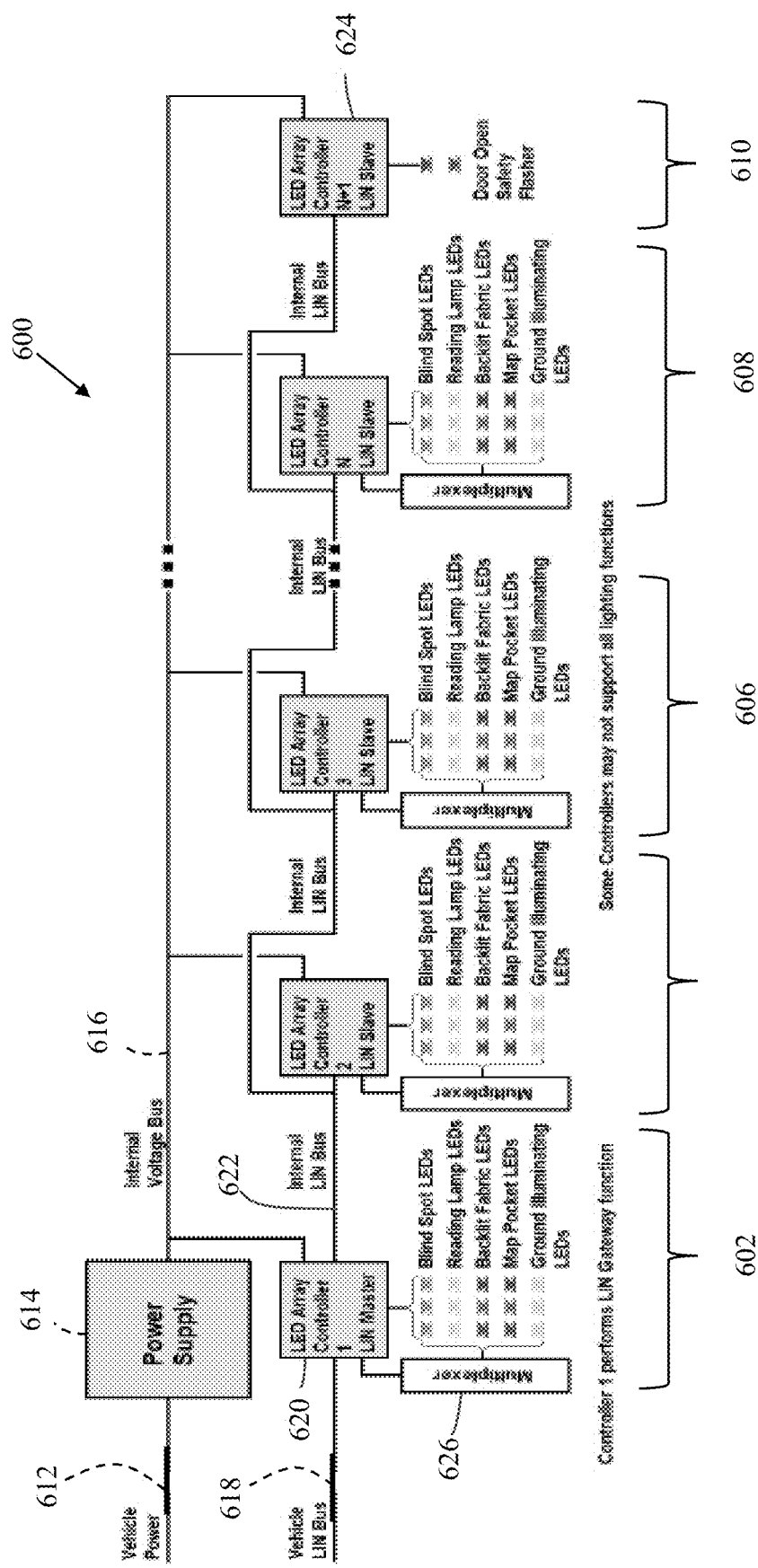
FIG. 6 is a block wire diagram of some of the electrical components of the lighting insert.

In each of FIGS. 1 through 4, the housing 102 may include a touch control area 118 for sensing the presence of a person's finger as an input to control the various lighting features of the lighting insert 100. The touch control area 118 is part of a touch control system 500 as shown in FIGS. 5A and 5B, which includes one or more touch sensors 502, a controller 504 for receiving inputs from the touch sensors 502, and one or more output drivers 506a for receiving output from the controller 504, or a LIN transceiver 506b for receiving output from the controller 504. The touch control system 500 may also include a power regulator 508 for receiving power from a power supply or input, and for providing power to the controller 504. The touch control system 500 may provide output, via the output drivers 506a, either directly to individual controllers of the various lighting features, or it may provide output via the LIN transceiver 506b to a vehicle local interconnect network (LIN) bus (as shown in FIG. 6). Touch controller 504 may be combined with lighting controllers. Outputs from the touch controller or touch subsystem of a multipurpose controller may be both through output drivers or LIN. Other automotive networks may be used instead of LIN, such as CAN, Automotive Ethernet, FlexRay, etc.

The touch sensors 502 may be one or more of capacitive sensors, field effect sensors, or other forms of sensor electrodes. The touch sensors 502 may include a touch pad below the fabric or material of the touch control area 118 (or the touch pad may be visible directly without a fabric or material overlaid thereon). The touch pad comprising one or more of the touch sensors 502 sensing electrodes. The sensing electrodes may receive input from, or provide input to, the controller 504. The touch sensors 502 may be embedded in or otherwise disposed in or on the backlit fabric area 106 of the housing 102 as shown in FIG. 1. The backlit fabric area 106 light source may illuminate the touch control area 118 to make it visually easier to locate.

In one embodiment, there may be multiple touch control areas 118 spaced apart along the backlit fabric area 106, one of which may be selected by a user based on his or her preference for use in controlling the various lighting functions. For example, the user may wish for the touch control area 118 to be located closer to the front of the vehicle. Non-selected touch control areas would then be deactivated and would not be illuminated for the user to see (only the selected touch control area 118 would be illuminated).

In other embodiments, the touch sensors 502 may be embedded in or otherwise disposed in or on another portion of the vehicle, for example, in or on a different portion of the housing 102.

The controller 504 may be, for example, a microcontroller. The controller 504 may be configured in various hardware and software components that provide sufficient drive or excitation signals to the touch sensors 502, and that receive signals from the touch sensors 502, and/or can determine whether or not the touch sensors 502 receives a valid touch as a function of one or more of the foregoing signals. The controller 504 also may be configured to receive signals from other sensors, as needed (e.g., a temperature sensor) and to determine whether or not the touch sensors 502 receives a valid touch as a function of the signals received from such other sensors.

In one embodiment, the controller 504 may be configured to provide one or more signals to one or more output drivers 506. These signals may place the respective output drivers 506 in a particular state or states. For example, an output driver 506 may be configured to change the state of one of the aforementioned light sources based on a state or condition of the vehicle (e.g., door open).

Turning now to FIG. 6, shown therein is a block diagram 600 depicting various electrical, circuit, and components of the lighting insert 102. The circuit shown includes five LED array controller nodes 602, 604, 606, 608, 610 of a LIN bus, where the first node 602 is a master LED array controller node. The other nodes are connected in series with the first (master) node 602.

The individual controllers may be powered by a local power source 614, which receives power from the vehicle's power source 612 (battery). A power bus 616 supplies individual power to each of the controller nodes.

Each controller node on the LIN bus may be controlled by a multiplexer 626, which provide true time division multiplexing to operate all of the lighting functions concurrently. In one embodiment, the multiplexers may involve simple "bank switching," whereby certain lighting functions are made mutually exclusive of one another (for example, the blind spot LEDs and the puddle lamp LEDs).

With input from the touch control system 500 as described above, a multizone RGB LED controller for each of the lighting sources. For example, a multizone controller for the backlit fabric area light 106 may be used to provide for pattern animation for occupant entertainment and other functions. The patterns may be random colors and brightness intensity shifts along a portion of the backlight fabric area, or emulation of certain natural phenomena such as Northern Lights, wind-blown grass, ripples in water, fire, or other visual effects.

In yet another embodiment, an additional multizone controller could be used with the blind spot presence indicator light 110 to provide a visual indication of the direction of adjacent traffic, which may be communicated, for example, by outputting light in a strobing manner from rearward to forward along the light pipe as a vehicle is approaching and then passing. Another multizone controller could be used with the reading lamp 112 to provide a lighted area to be tailored by a user.

A common interlinked control of the integrated lighting features may be provided to create various operating modes. For example, a controller may automatically dim the backlit fabric area light 106 and/or the reading lamp 112 when the blind spot presence indicator light 110 is active.

As shown, a common communication circuit and software module (bus) may be provided to interface with the vehicle platform. For example, the module may be a single wire LIN, which produces economic benefits by reducing the wire count passing from the vehicle body to the door. The single wire could communicate signals for controlling all lighting features of the lighting insert 100. Alternatively, the communication bus may be or utilize a CAN or Ethernet. Other communication protocols that could be used include SAE (e.g., J1939), ISO (e.g., 14229), UDS, and wireless.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A multi-purpose lighting assembly for integrating into an interior panel of an automobile, comprising:
    a plurality of light sources integrated into a housing, wherein each of the light sources is associated with respective ones of the plurality of light transmission portions for outputting light, and wherein each of the plurality of light sources is configured for a different predetermined function associated with a particular use of, a condition of, or a state of the automobile; and
    an electrical circuit comprising a communications bus and a plurality of individual controller circuits associated with respective ones of the plurality of light sources for controlling the predetermined functions of the light sources, wherein one of the plurality of individual controller circuits is a master node circuit and the remaining ones of the plurality of individual controller circuits are connected in series with the master node circuit.

2. The lighting assembly of claim 1, wherein at least one of the plurality of individual controller circuits associated with one of the plurality of light sources and one of the plurality of light transmission portions is a multizone controller programmed to outputting light at discrete predetermined locations of the one of the plurality of light transmission portions and at discrete predetermined times upon activation to communicate information or lighting effects.

3. The lighting assembly of claim 2, wherein the one of the plurality of light transmission portions associated with the multizone controller is a backlit fabric area of the housing, wherein the light source associated with the multizone controller comprises a plurality of individual lights, where outputting light at discrete predetermined locations and at discrete predetermined times creates a pattern animation, and wherein the pattern animation comprises one or more of a random color and brightness intensity that shifts along a portion of the backlight fabric area, and an emulation of a natural phenomenon.

4. The lighting assembly of claim 1, wherein the electrical circuit is configured and programmed to provide a common interlinked control of at least two of the plurality of light sources such that when one of the at least two light sources performs a predetermined function associated with a particular use of, a condition of, or a state of the automobile, and the other one of the at least two light sources automatically and simultaneously performs a different predetermined function without user input.

5. The lighting assembly of claim 1, further comprising at least one touch control device electrically connected to the electrical circuit for receiving a user input.

6. The lighting assembly of claim 5, wherein the touch control device comprises:
   one or more touch sensors;
   a controller for receiving inputs from the touch sensors;
   one or more output drivers for receiving output from the controller; and
   a power regulator for receiving power from a power supply or input, and for providing power to the controller.

7. The lighting assembly of claim 5, further comprising a plurality of the touch control devices spaced apart along a backlit fabric area of the housing, each of which is selectable by a user for use in controlling the plurality of light sources and is configured to be illuminated when selected by the user and not illuminated and deactivated if not selected by the user.

8. The lighting assembly of claim 1, wherein the plurality of light sources includes two or more light sources selected from the groups consisting of a blind spot indicator light indicating a presence of an object proximate to the automobile, a door open light indicating an open condition of the door, an ambient light for reading, a ground illuminating light for projecting a word, shape, or indicia on the ground outside the automobile, a dynamic multi-zone two-dimensional ambient light, and map pocket illuminating light.

9. The lighting assembly of claim 1, further comprising a wire harness for carrying wires from each of the plurality of light sources to a connector, wherein the connector is configured for connecting to an electrical system of the automobile.

10. The lighting assembly of claim 1, wherein each of the plurality of light sources integrated into the housing is adapted to transmitting light therefrom at one or more preconfigured directions and spread angles.

11. The lighting assembly of claim 10, wherein the preconfigured directions and spread angles may be modified manually by reorienting one or more of the plurality of light sources or a component thereof from a first configuration to a second, different configuration.

12. The lighting assembly of claim 1, wherein the interior panel of the automobile is integral to or part of one of a pillar, a door, a chair, a desk, a bed, and an appliance.

* * * * *